Figure 5:
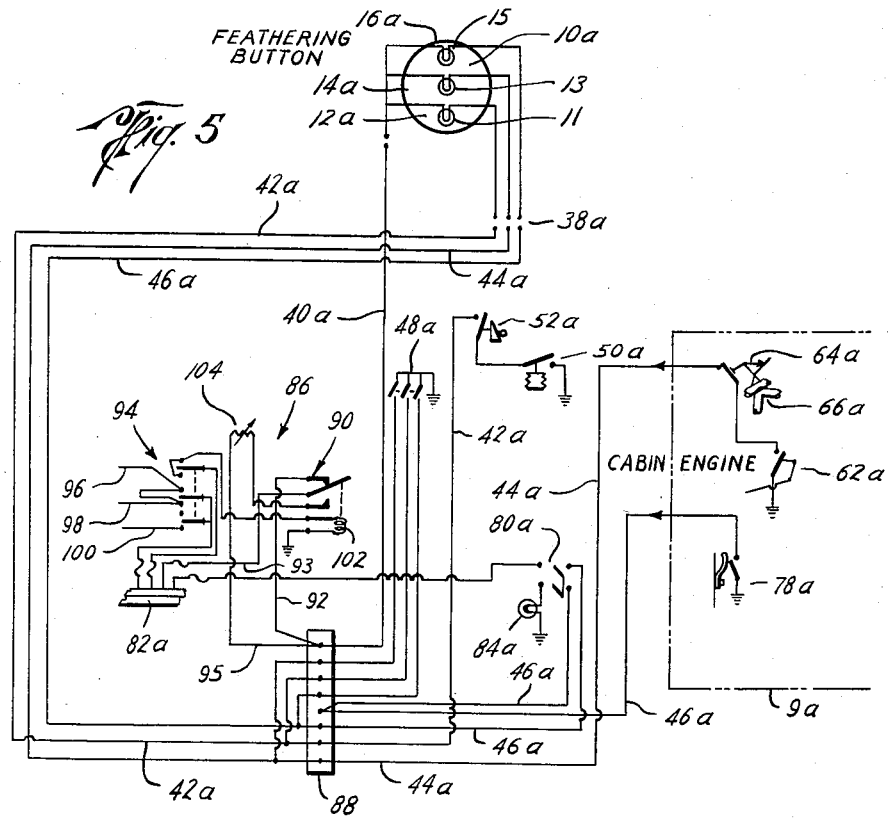

Feb. 28, 1961  W. W. LOWREY ET AL  2,973,042
MULTI-ENGINE AIRCRAFT FEATHER INDICATING SYSTEM
Filed Aug. 17, 1954  3 Sheets-Sheet 1

Fig. 1

Wallace W. Lowrey
George T. Cendrick, Jr.
Robert J. McQuilkin
John H. Klopp
INVENTORS BY James F. Weiler &
Jefferson O. Hiller
ATTORNEYS Feb. 28, 1961    W. W. LOWREY ET AL    2,973,042
MULTI-ENGINE AIRCRAFT FEATHER INDICATING SYSTEM
Filed Aug. 17, 1954    3 Sheets-Sheet 2
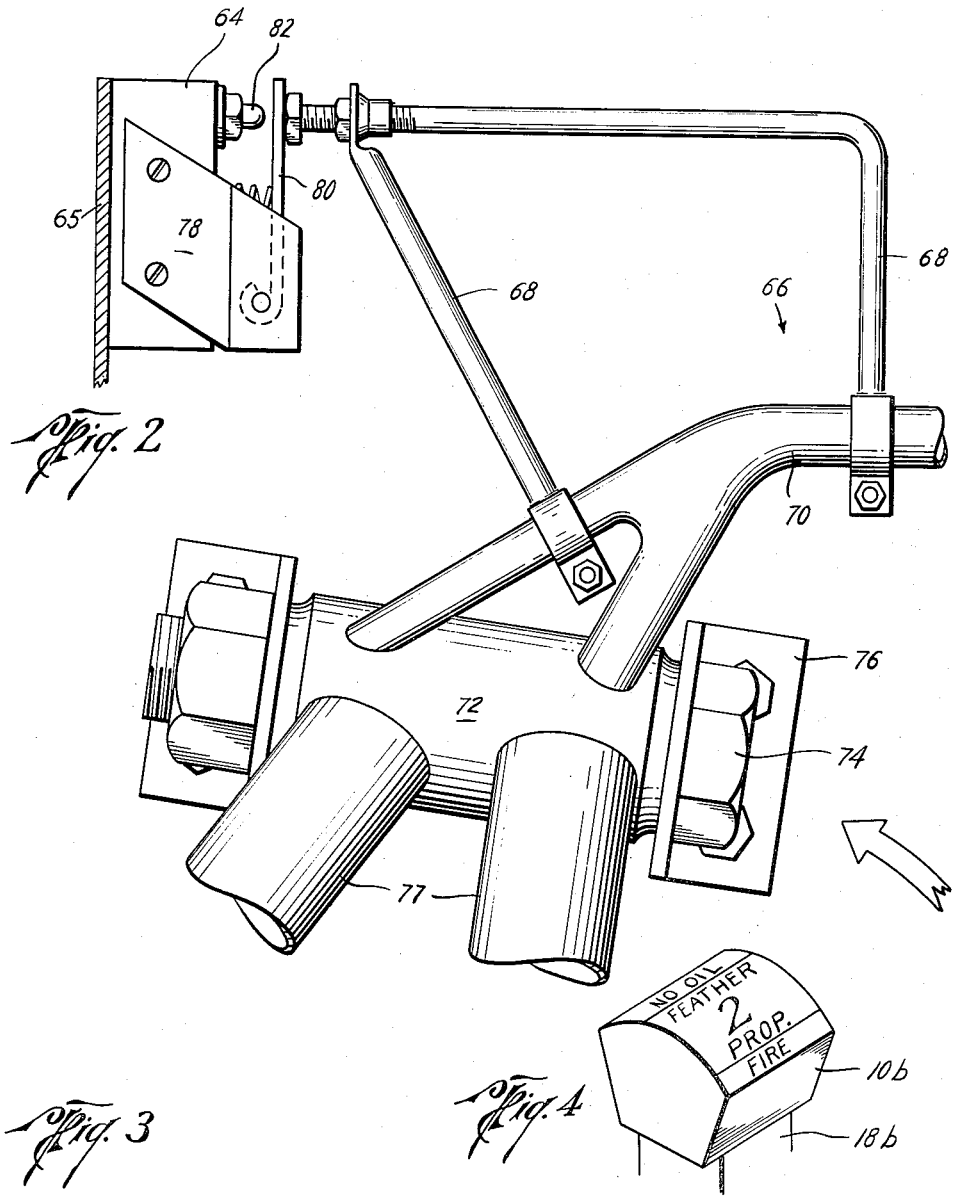
Wallace W. Lowrey
George T. Cendrick, Jr.
Robert J. McQuilkin
John H. Klopp
INVENTORS
BY James F. Weiler
Jefferson D. Giller
ATTORNEYS Feb. 28, 1961  W. W. LOWREY ET AL  2,973,042
MULTI-ENGINE AIRCRAFT FEATHER INDICATING SYSTEM
Filed Aug. 17, 1954  3 Sheets-Sheet 3

Wallace W. Lowrey
George T. Cendrick, Jr.
Robert J. McQuilkin
John H. Klopp
INVENTORS

BY
ATTORNEYS

United States Patent Office 2,973,042
Patented Feb. 28, 1961

2,973,042

MULTI-ENGINE AIRCRAFT FEATHER INDICATING SYSTEM

Wallace W. Lowrey, 5225 Claremont, Houston, Tex.; George T. Cendrick, Jr., 1016 Ave. F, South Houston, Tex.; Robert J. McQuilkin, Houston, Tex.; and John H. Klopp, 7505 Anzac, Houston, Tex.; said McQuilkin assignor to said Lowrey, said Cendrick, and said Klopp Filed Aug. 17, 1954, Ser. No. 450,482

1 Claim. (Cl. 170—135.24)

The present invention relates to an aircraft indicating system and more particularly relates to an aircraft indicating system for feathering one or more propellers of multiengine aircraft.

There are presently in use in aircraft two general types of feathering arrangements for feathering propellers as the need therefor arises. The term feathering, of course, means that the blades are turned so that they are parallel to the direction of airflow. This causes the blades to offer the least amount of resistance to the air and at the same time stops the rotation of the engine. One type feathering arrangement utilizes a feather control which is manually-operated when the pilot discovers a particular motor or engine is not functioning as it should or other conditions occur which make it necessary or desirable to feather a particular propeller and thereby stop rotation of that particular engine. Many serious accidents have occurred, however, due to the fact it is a critical period when it is necessary to feather a propeller and the pilot is most engaged and under the most emotional strain. In manually-operated systems, for these and other reasons, many serious accidents have occurred due to the fact that the wrong feather button is pushed, there being one for each engine or motor, or that the feather button is not pushed in time to avoid serious loss of airspeed due to drag which is caused by the propeller blades being flat against the airflow.

The second system utilizes an automatic feathering system which was introduced generally with the introduction of the high performance airplane with high density propellers. Automatic feathering, of course, relieves the pilot of the chore of making an instantaneous and absolutely accurate decision as to what has happened and selecting the proper control for appropriate action at a time when his duties are the most complex.

Automatic feathering, however, is generally unsatisfactory in that on numerous occasions automatic feathering devices have failed to perform properly. For example, automatic feathering systems feather propellers and by so doing cause a complete loss of power in many instances when there is no necessity therefor, and in many cases places the aircraft in a hazardous position, such as when taking off where all the power is needed.

It would be advantageous to provide a feathering system or control which may be operated manually by the pilot thereby avoiding the disadvantages of the automatic feathering systems, yet gives a positive indication as to the particular engine to be stopped and which includes means in the feather control for that particular motor to give an indication that the propeller controlled by that feather button needs to be feathered thereby avoiding the disastrous consequences of feathering the wrong propeller or propellers.

It is therefore a primary object of the present invention to provide a feather indicating system in which an indication that the propeller on a particular engine should be feathered is given by the feather control itself so that the feather control may be operated, if desired, to feather the propeller on the engine in trouble and avoid the hazards of feathering the wrong propeller.

A further object of the present invention is the provision of a feathering system in which the feather control for each propeller and the indicating means for giving a signal that a particular motor or motors should be stopped are combined.

Yet a further object of the present invention is the provision of such a feather indicating system which may be readily and easily installed on aircraft and which may be used in connection with any conventional manual feathering system.

A still further object of the present invention is the provision of a feather indicating system which includes novel means for indicating a reduction of or reverse torque in the motor so that the propeller of that motor may be feathered if desired.

A still further object of the present invention of an aircraft feather indicating system which combines the signal means in the feather control for giving indications of reduced or reverse torque, fire detection and low or no oil pressure.

It is yet a further object of the present invention to provide such a feather indicating system which is inexpensive to manufacture, repair and maintain in operation, which may readily and easily be installed and which is effective and reliable in use.

Figure 6:
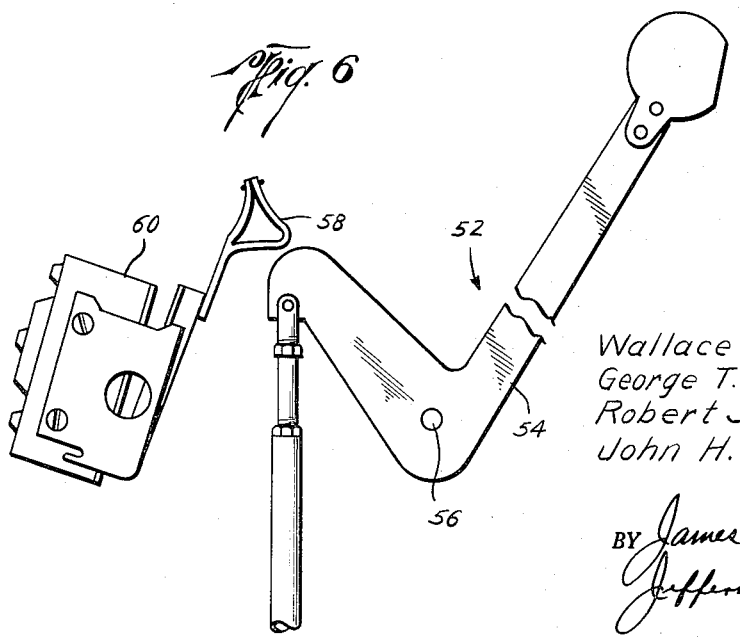

Other and further objects and features of the invention will be apparent from the following description of preferred examples of the invention, given for the purpose of disclosure, taken in conjunction with the accompanying drawings, in which like character references designate like parts throughout the several views and where Figure 1 is a diagrammatic view of a feather indicating system according to the invention and illustrated in combination with a conventional feathering system, Figure 2 is an enlarged, fragmentary view, in elevation, illustrating a reverse torque indicator in accordance with the invention, Figure 3 illustrates a modified form of a feather indicator, Figure 4 illustrates a still further modified form of a feather indicator, Figure 5 is a wiring diagram illustrating another form of feather indicating system according to the invention, and Figure 6 is an enlarged, fragmentary, side elevation illustrating a normally-closed microswitch which is opened by the mechanical action of the mixture control when placed in idle-cut-off.

Referring now to the drawings, and particularly to Figure 1, a feather button 10 is illustrated which has three signal areas, the area 12 which gives an indication of low or no oil pressure, the central area 14 which gives an indication of reverse torque or that the particular engine is not carrying its part of the load, and the area 16 which indicates a fire for that particular engine or in its vicinity. Preferably, the feather button 10 may be formed of a plastic material and it should have the areas 12, 14 and 16 which will light up to give the appropriate indication. Obviously, the feather button 10 may be formed in a variety of ways and no further description thereof is deemed necessary.

The feather button 10 may be secured to any conventional, manually-actuated, feathering system and such a conventional system is illustrated on the right hand side of Figure 1, when viewing the drawing. This particular feathering system is a typical one for Hamilton standard propellers.

In this feathering system the feather button 10 is secured to the shaft 18 which extends through the holding coil 20 and which engages and bridges the electrical contacts 22 and 24 when the shaft is pushed toward these contacts. One end of the coil 20 is connected through the pressure cutout switch 26 to ground and the other end is connected to the contact 24. The electrical contact 22 is connected through the circuit breaker 32 to the battery 30. Contact 24 which is energized by being bridged with contact 22 is connected through the normally-open relay 28 to ground which in turn closes the normally-open relay 28 when the feather button 10 is pressed. Another conductor from the battery 30 through the circuit breaker 32 and then through the points of the relay 28, shown open in Figure 1 but which will be closed when the feather button 10 is pressed, furnishes current to the motor 34 which in turn actuates pump 36 to feather the propeller, not shown.

Thus, when it is desired to feather a particular propeller, the feather button 10 is pressed which causes the electrical contacts 22 and 24 to be bridged thereby closing the circuit to the relay 28 and thereby closing this relay which closes the circuit to and therefore actuates the feather pump motor 34 which in turn actuates the feather pump 36 which feathers the propeller. Also, the holding coil 20 is energized which holds the shaft 18 in depressed position until such time as the propeller becomes completely feathered and pressure builds up in a distributor valve, not shown, thus opening the pressure switch 26 which breaks the circuit of the coil 20 releasing spring loaded shaft 18, thereby breaking all circuits and stopping the feathering motor 34.

The particular feathering arrangement illustrated is conventional and, as such, forms no part of the present invention and as the present feathering indicating system may be combined with any manually-operated feather system, no more description of a particular feathering system is deemed necessary.

Referring again to the feather indicating system of the present invention and the example illustrated in Figure 1, a plug in 38, which may be of any suitable type, such as a cannon plug, is provided for the conductors 40, 42, 44 and 46, conductor 40 supplying voltage to all the filaments of the signals in the feather button 10, and conductors 42, 44 and 46 being connected to the oil pressure signal, the reverse torque signal, and the fire signal, respectively. The conductor 40 is connected to any suitable source of power such as a storage battery 41 and the like.

For test purposes, a test switch 48 is connected to the conductors 42, 44 and 46 to test whether the lights would appear in the lighted areas of the feather button 10, by closing the circuits to ground.

The electrical conductor 42 is connected to any conventional oil pressure transmitter switch 50 and to ground so that when there is no or a predetermined minimum oil pressure the oil pressure transmitter switch 50 completes the circuit from the power source, not shown, through the conductors 40 and 42 to ground and hence lights up the area 12 which indicates there is no oil pressure. Any type low oil pressure switch may be used. In order to prevent the light from shining after an engine has been stopped a normally-closed Microswitch 52 is connected in the conductor 42, here shown in open position, which Microswitch 52 is opened by the mechanical action of the mixture control when placed in the idle-cut off. A typical idle-cut-off arrangement is illustrated in Figure 6.

Referring to Figure 6 the idle-cut-off 52 includes the conventional idle-cut-off crank arm 54 which is pivoted by the pin 56 and which actuates the contact member 58 of a Microswitch 60 which may be of any conventional type. While any preferred type switch and switch actuator may be used, Microswitches are presently preferred, such as a 9-10831 Type T Microswitch Actuator and BZ-3YT AN3216-1 Microswitch of Microswitch, Freeport, Illinois, division of Minneapolis-Honeywell Regulator Company, which have been satisfactory. These are also satisfactory for the switches and actuators mentioned later herein. Since these various elements may be purchased commercially, as indicated, no detailed description thereof is deemed necessary. The purpose of the Microswitch opened by the mixture control when placed in idle-cut-off is to open the circuit to the oil indicating area 12 in the feather button 10 when that particular engine has been feathered.

Referring again to Figure 1, the conductor 44 is connected through the Microswitch 62 to the reverse torque switch 64 connected to a fixed wall 65, only a fragment being shown, which reverse torque switch 64 is actuated by reverse or reduced torque being developed in an engine. While any desired means may be utilized to actuate the switch 64 in response to reverse torque developed in a particular engine, a particularly satisfactory arrangement is by connecting the reverse torque actuator to the engine mount, all as generally indicated by the reference numeral 66. This particular assembly is better illustrated in Figure 2.

Referring now to Figure 2, a striker arm assembly 68 is bolted or otherwise secured to the ring bracket 70 of the cowling support, not shown. The ring bracket 70 is connected or otherwise secured to the engine mount 72 which is bolted by the engine mount bolt 74 to the fire wall attachment fitting assembly 76 which is secured to the aircraft structure, such as the fire wall, not shown. The arms 77 are part of the engine mount 72 and extend to the engine, not shown. The Microswitch 64 may be bolted or otherwise secured by the bracket or plate 78 to the aircraft structure, not shown. Thus, when the particular engine connected to the support 76 is developing torque, the striker arms 68 will be in the position illustrated in Figure 2. When reverse torque is developed due to propeller drag or a reduction of torque is experienced due to loss of power the engine mount 72 will be displaced from the position shown. This displacement is allowed by means of rubber cushioning within the mount 72 and completely surrounding the bolt 74. The purpose of this rubber mounting is to absorb vibrations of the engine but whose characteristics also allow the action necessary to actuate the switch 64 by moving the striker arm 68 generally to the left, as the drawing is viewed, thereby moving the movable contact arm 80 into contact with the contact 82 of the Microswitch 64 and thereby closing the circuit through the area 14 in the feather button 10 (see Figure 1) including the circuit comprised of the electrical conductors 40 and 44 to ground.

Referring again to Figure 1 the Microswitch 62 is provided in the conductor 44 in order to avoid a false indication when the throttle is retarded. Thus, while this particular switch is shown in open position, it is normally-closed unless the throttle is retarded. Of course, when retarding the throttle, reverse torque may develop as a result of this action which does not indicate any failure of that particular motor. The switch 62 is so adjusted to open at a predetermined point of normal engine operation which is before the point at which switch 64 closes so that circuit 44 is only completely closed when power is desired but not being produced by that particular engine. The Microswitch 62 may be connected to the throttle by any suitable linkage, not shown, so that its contacts will be opened by the mechanical action of closing or retarding the throttle. Since numerous such arrangements may be used, no more detailed description thereof is deemed necessary. For example, an arrangement such as illustrated in Figure 6 is satisfactory.

The electrical conductor 46 is connected to a series of fire detector switch mechanisms indicated by the reference numeral 78 which may be of any conventional type, only one being shown for convenience. For example, Wilcolator type fire detectors as illustrated in U.S. Patent No. 2,253,552 may be used. Thus, when there is a fire in the engine or the vicinity of the engine which is controlled by that particular feather button 10, the switch 78 will be closed thereby closing the circuit through the fire indicating area 16 of the feather button 10 by means of the circuit comprised of the electrical conductors 40 and 46 to ground through the fire switch 78.

Connected across the conductor 46 is a double pole, double throw switch 80 which normally is connected with the contacts in the conductor 46, although shown in open position. The switch 80 may be moved to break the circuit comprised of conductor 46 but by so doing completes the circuit from the buss bar 82 through the indicator 84 to ground to indicate that the circuit comprised of conductor 46 is open. The purpose of the switch 80 and the indicator 84 is to put out the warning light in the area 16 after appropriate action has been taken and to indicate that the fire warning circuit is inoperative, respectively. No further description of this particular arrangement is deemed necessary.

In operation, the feather button 10 and its associated circuits are installed in a multiengine aircraft for each engine. The various elements may be connected to and supported by parts of the aircraft in any desired manner. Before operation, for test purposes, the test switch 48 may be closed and if the feather indicating system light filaments and conductor 40 are functioning properly, all three areas, that is those indicated by the reference numerals 12, 14 and 16 of the feather button 10, will be lighted. If the circuits are functioning properly, releasing the switch 48 will cause it to open, the switch being a momentary contact switch. In operation, in the event there is no or a predetermined low oil pressure for a particular engine, the pressure switch 50 will close thereby completing the circuit through the area 12 of the feather button 10 giving such an indication. In the event reverse torque is developed in an engine due to propeller drag or a reduction of torque due to loss of power the Microswitch 64 will be closed thereby closing the circuit through the area 14 of the feather button 10 to give such an indication. In the event there is a fire in the vicinity of a particular engine, the switch assembly 78 will be closed thereby giving an indication of this fact in the area 16 of the feather button 10. In the event of any one or more of these contingencies the particular feather button for the particular engine which is in difficulty gives the signal which assures that the operator or pilot will feather that particular engine's propeller if he so desires. If the pilot decides that such engine should be stopped, he merely presses the feather button 10 which has been lighted up in one or more of the areas indicated, which closes the circuit to the relay 28 thereby closing the relay which actuates the motor 34 which in turn actuates the pump 36 which feathers the particular propeller of the engine which is in difficulty.

It is noted that the indication is advantageously given in the particular feather button which must be actuated and in none other. Also, that in the event the feather button 10 is pressed the mechanical action of the mixture control when placed in idle-cut-off shuts the light off in the no oil pressure indicating area 12 for that particular engine. Also, when reverse torque in a particular engine is developed due to the fact that the throttle is retarded, the Microswitch 62 is opened thereby opening the circuit which otherwise would be closed due to the reverse torque action occasioned thereby and the closing of the Microswitch 64 which eliminates the possibility of giving false indications.

In the event a feather button is not used and a switch arm is used, as indicated in Figure 3, the panel 10a which has the switch 18a which must be moved to feather a propeller is the area which gives the indication.

Referring to Figure 4, in the event the particular aircraft has a feathering system which utilizes a lever instead of a feather button the feather head 10b may be placed on the feather arm 18b so that only the end or other part of that particular lever will give a signal thereby giving a signal only in connection with the particular lever, switch or button which must be actuated to feather a particular propeller.

Referring now to Figure 5, the feather button 10 is better illustrated and a modified form of circuit is diagrammatically set forth. In this particular modification, the same reference numerals are used as indicated heretofore except that the reference letter "a" has been added to designate similar parts.

Referring now to Figure 5, it is seen that the feathering button 10a has the lamps 11, 13 and 15 disposed in the no oil area 12a, reverse torque area 14a and fire indicating area 16a, which lamps are connected in the electrical conductors connected to the conductors 42a, 44a and 46a of the feather indicating system. These particular lamps, of course, may be of any suitable type and no detailed description thereof is deemed necessary.

In general, the arrangement illustrated in Figure 5 is the same as that illustrated in Figure 1 except that a dimming assembly, generally indicated by the reference numeral 86, is provided so that when sufficient illumination is provided in the signal areas of feather button 10a in the daytime, at night, the signal given is not so bright as to blind or otherwise interfere with the operations of the pilot.

Referring now particularly to the dimming assembly illustrated in Figure 5 the conductor 40a supplying voltage to the lamps 11, 13 and 15 is connected through the terminal strip 88 through the single pole, double throw relay 90 by the conductors 92 and 93 to the source of power 82a. Thus, when the dimming relay 90 is in the position illustrated in Figure 5, full voltage is supplied to the lamps. The voltage, of course, would be the same as that of the aircraft's electrical system.

A three pole, two throw center off switch 94 is provided, which is normally opened during daylight, for example, a Cutler Hammer No. 8742,K8 AN-3226-1 has been found to be satisfactory and this is connected to the navigation lights and may take the place of the navigation lights switch. The conductors 96, 98 and 100 extends to the usual navigation light system, not shown, and the movable elements of the switch are connected to the buss bar 82a, as illustrated. Upon closing the switch 94 the coil 102 of the dimming relay 90 is energized thereby moving the movable elements of the dimming relay 90 into contact with the lower contact thereof which closes the power circuit 40a through the conductor 95, the resistance 104 and conductor 93. The resistance 104 may be of any suitable type, such as a thyrite resistor, a rheostat potentiometer or the like.

Thus, the example according to the invention illustrated in Figure 5 is the same as that of Figure 1 except that a dimming assembly has been incorporated into the usual navigation lights for nighttime operation.

Any desired colors may be used in connection with the feather button and, for example, yellow may be used to light up the area 12 to indicate no or low oil pressure, white may be used to light up the area 14 to give an indication of reverse torque or a particular engine is failing to put out its share of the load, and the area 16 may be red to give a fire indication. Obviously, any desired arrangement of colors may be used.

It should be noted that all the electrical elements, switches, and the like are conventional and may be purchased commercially. Thus, since many types of switches, relays and the like may be used, no detailed description thereof is deemed necessary.

In Figures 1 and 5, the broken line 9 and 9a, respectively, separates the engine and cockpit portions; however, other arrangements of parts will readily suggest themselves to those skilled in the art.

Various arrangements of parts and changes in details may be made for a variety of manually-operated feather systems. It is only necessary that the indication for a particular engine be given in the feather button or on the head of the feather lever or the panel, as the case may be. In the following claims, for clarity, "feather button" is used but it will be understood that this includes any type of manually-actuated control, such as a lever arm or the area immediately proximate thereto.

The present invention, therefore, is well adapted to carry out the objects, attain the ends and has the advantages set forth as well as others which are inherent therein. The present invention is to be limited only by the spirit thereof and the scope of the appended claim.

What is claimed is:

A feather indicating system for multi-engine aircraft comprising, a separate feather system for each engine of said aircraft for separate feathering of each said engine, a separate feather button operatively connected to each said feather system, and signal means at least closely adjacent each feather button and separate from the other of the feather buttons directly responsive to reduced or reverse torque of the engine which that feather system controls, said signal means including an electric circuit, a switch actuated by reverse or reduced torque of the engine for closing the circuit, a lamp in the circuit disposed in the feather button for indicating said reverse or reduced torque of the engine, and an additional switch in the circuit linked to the throttle of the engine and arranged to open the circuit upon retarding the throttle a predetermined amount.

References Cited in the file of this patent

UNITED STATES PATENTS

| | | |
|---|---|---|
| 2,410,998 | Reavis | Nov. 12, 1946 |
| 2,426,089 | Fitzgerald | Aug. 19, 1947 |
| 2,449,104 | Burcham | Sept. 14, 1948 |
| 2,601,901 | Muma | July 1, 1952 |

FOREIGN PATENTS

| | | |
|---|---|---|
| 133,839 | Sweden | Dec. 4, 1951 |